Figure 1:
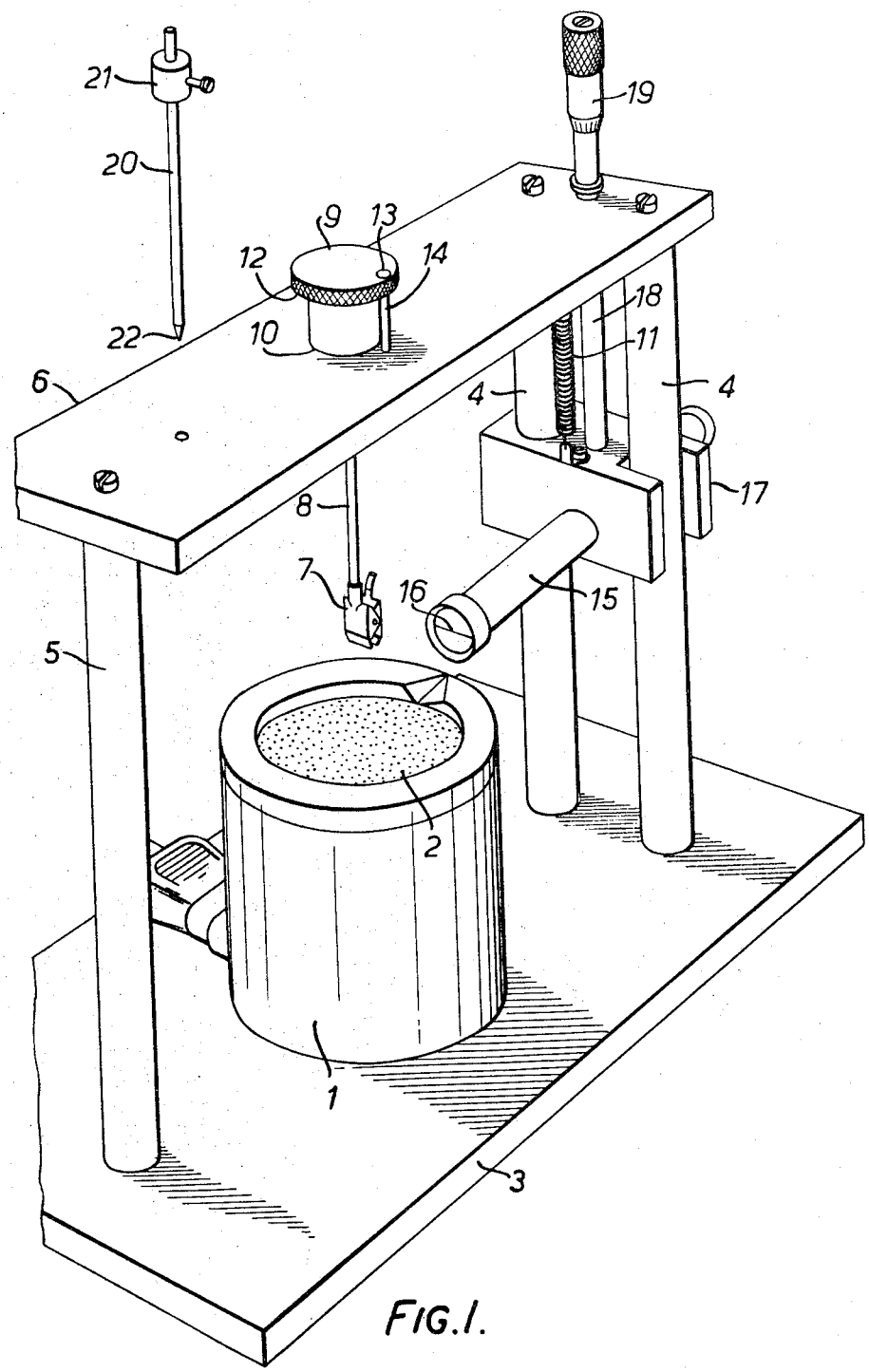

United States Patent [19]
Monger et al.

[11] 3,761,181
[45] Sept. 25, 1973

[54] METHOD AND APPARATUS FOR MEASURING SOLDERABILITY OF METAL SURFACES

[75] Inventors: Kenneth Sydney Monger, Great Baddow; Frank Wallis, Chelmsford, both of England

[73] Assignee: The Marconi Company Limited, Chelmsford, Essex, England

[22] Filed: Dec. 6, 1972

[21] Appl. No.: 312,748

[30] Foreign Application Priority Data
Dec. 11, 1971 Great Britain................... 57,656/71

[52] U.S. Cl....................... 356/156, 29/484, 228/56, 228/56.5, 228/57
[51] Int. Cl............................................. B23k 37/04
[58] Field of Search............................ 356/156, 249; 228/56, 56.5, 57

[56] References Cited
OTHER PUBLICATIONS
Tests for Tin Lead Soldered Joints Bureau of Mines Report No. 6963 U.S. Dept. of Interior June 1967.
Solderability Testing, W. B. Harding, Bendix Corp. Kansas City Division, Conf. 650702-2, Cont. No. AT(-29-1)-613.
Solders and Soldering, H. H. Manko, McGraw-Hill USAEC (1965) N.Y., 1964, pp. 262-272.

Primary Examiner—David Schonberg
Assistant Examiner—S. K. Morrison
Attorney—Donald M. Wight et al.

[57] ABSTRACT

A method of obtaining an indication as to the solderability of a metal consists of focussing an optical telescope on a surface of molten solder in a container and noting the vertical height of the telescope, dipping a sample of the metal to be soldered into the molten solder, adjusting the vertical height of the telescope and refocussing it at the top of the solder meniscus formed up the sample, noting the difference between the two heights of the telescope and comparing the change in height with the change in heights achieved for samples of good solderability and poor solderability.

11 Claims, 4 Drawing Figures

METHOD AND APPARATUS FOR MEASURING SOLDERABILITY OF METAL SURFACES

This invention relates to apparatus for measuring the solderability of metallic surfaces.

The important factor in making satisfactory soldered joints is the ability of the two surfaces to be joined to be wetted by molten solder, or in other words the solderability of the surfaces. In order to avoid waste, it is desirable in many cases to determine the solderability of the parts to be soldered before assembly proper. It is common to check the solderability of round wire, for example, by what is known as the bead test. The round wire is fluxed and lowered into a globule of molten solder. The time which elapses between the wire contacting the globule and the solder flowing round the wire is an indication of the wire's solderability. For flat samples, it is common to use the sample to skim the surface of a solder bath or to dip the sample vertically into the solder bath for varying times. In this case an indication of solderability is provided by the minimum time of exposure of the sample to the solder for acceptable wetting to occur.

Whilst the above mentioned methods provide a useful rough guide to the solderability of the sample involved, no measure is given of how good or thorough the wetting is.

Apparatuses are available by which a measure of the goodness and thoroughness of wetting may be obtained. Such apparatuses usually rely on measuring the wetting force exerted on the samples during vertical dipping. Not only are such apparatuses complicated, relatively delicate and expensive, but also the results obtained can be subject to considerable error.

The present invention seeks to provide improved methods of measuring the solderability of surfaces and improved apparatuses for carrying out such measurements, which are realtively simple yet capable of providing usefully reliable indications of solderability.

According to this invention, a method of obtaining an indication of the solderability of a metallic surface comprises the steps of noting the level of molten solder in a container, taking a sample of the metal to be soldered and comparing the height of the meniscus formed up the sample with the previously noted level of the solder to obtain an indication of the solderability of said metallic surface.

Normally the sample would be fluxed prior to being lowered into said molten solder.

As will be appreciated, if the sample is of substantial volume compared with the volume of solder in said container, the general level of the solder will rise as said sample is lowered therein to. If, however, the sample is of very small volume compared with the volume of solder in said container, the rise in solder level due to the volume of the sample entering therein may be neglected. In the case where a metal sheet is required to be tested for solderability, it would be common to take a sample of the strip, 0.375 inch wide and of thickness 0.016 inch and lower this into a cylindrical container of solder 3 inches in diameter and 3 inches deep.

According to a feature of this invention an apparatus for obtaining an indication of the solderability of a metallic surface comprises a container for containing a quantity of molten solder, means for measuring the level of solder within said container, means for lowering a sample of the metal to be soldered into said solder and means for measuring the height of the meniscus of solder up said sample. Preferably said means for measuring the level of solder in said container and the height of the meniscus comprises a microscope incorporating a sight line and mounted to be of adjustable height by means of a vernier control. Preferably again the means for lowering said sample includes means for controlling the rate of descent of said sample into said solder. This last mentioned means may comprise a peg adapted to abut an abutment on a member passing through a beam, arranged above said solder container, means being provided for suspending said sample from said member, the abutment of said member having a hole provided therein adapted to accept said peg when said member is rotated to align said hole and said peg. Said hole may be an open hole extending through said abutment, control of the rate of descent of said sample being obtained by virtue of the friction between said peg and the sides of said hole, or said hole may be a blind hole, control of the rate of descent of said sample being obtained by the leaky piston and cylinder effect between said peg and said blind hole or said hole may be a blind hole with an air bleed passageway so dimensioned as to achieve a required rate of descent of said sample.

In order to facilitate initial measurement of the level of solder in said container, preferably a rod is provided having along its length an adjustable abutment, said rod and abutment being provided to enter the hole in said beam from which said member passes, until said abutment abuts said beam, whereupon by adjustment of said adjustable abutment the end of said rod directed towards solder contained in operation in said container, may be adjusted until this almost touches the surface of said solder, whereby the sight line of said microscope may be aligned midway between the end of said rod and the reflection of that end in the suface of said solder. Preferably the end of said rod adjacent said solder is pointed. Conveniently said container is electrically heatable.

Figure 2:
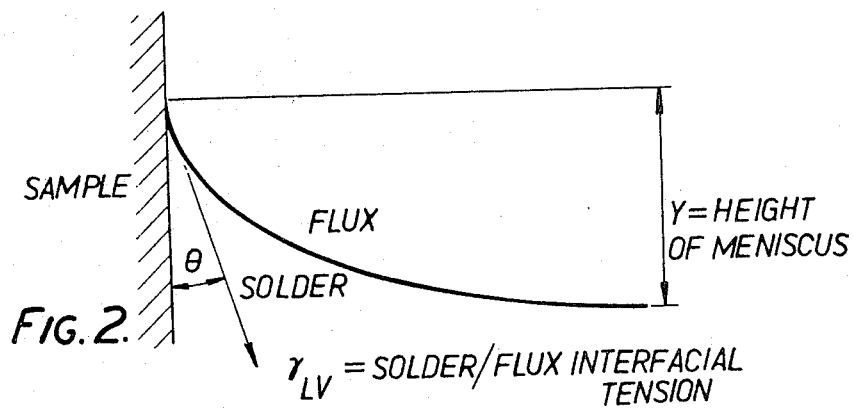
Figure 3:
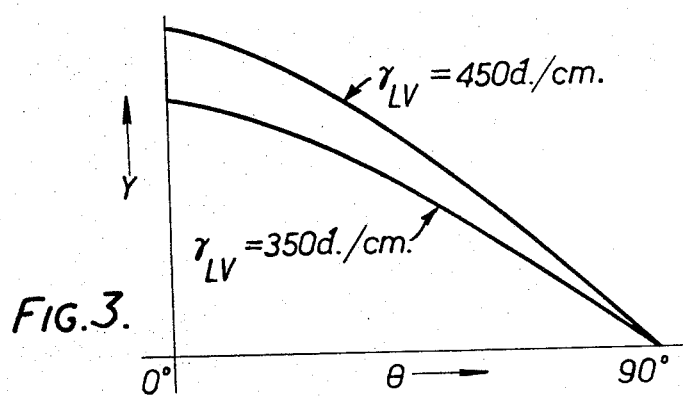
Figure 4:
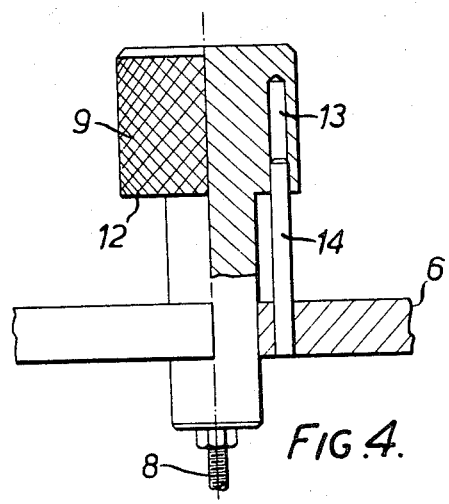

The invention is illustrated in and further described with reference to the accompanying drawings in which, FIG. 1 is a perspective view of one apparatus for obtaining an indication of the solderability of a metal sample in accordance with the present invention FIGS. 2 and 3 are explanatory graphical diagrams and FIG. 4 shows a modification to the apparatus of FIG. 1. Like references in FIG. 4 denote like parts in FIG. 1.

Referring to FIG. 1, an electrically heated solder container 1 is filled with solder 2. The container 1 is mounted upon a base 3 from which extend three vertical members, two referenced 4 at what is in operation the front of the apparatus and one referenced 5, at the rear of the apparatus. The vertical members 4 and 5 support a top beam 6 which extends over the solder container 1. A sample holding clip 7 is suspended by a shaft 8, from a member 9 which member 9 is slidable in a vertical direction within a hole 10 in the top beam 6 over the surface of the solder 2. The member 9 is prevented from passing completely through the hole 10 by an abutment 12. A hole 13 extends through the abutment 12 and is such as to accept a peg 14 upstanding from said beam 6, when said member 9 is rotated to the position shown. The peg 14 is provided not only to hold the member 9 in an extreme upper position in which a sample held within the clip 7 is clear of the solder 2, but also, by virtue of the fact that it is a relatively close fit within the hole 13, acts to cause th member 9 to fall relatively slowly upon alignment of the peg 14 and the hole 13.

An optical microscope 15 having a sight line 16 incorporated therein is mounted in a carriage 17. The carriage 17 is mounted on the vertical members 4 so as to be movable in a vertical direction. Movement of the carriage 17 is effected by means of a spring 11 and a shaft 18 driven by a vernier or micrometer head 19. Accessory to the apparatus so far described is a rod 20 having an adjustable abutment 21. The rod 20 and the abutment 21 are such that the rod may be passed through the hole 10 in beam 6 so far as the abutment 21, which abutment 21 may then be adjusted until the pointed end 22 of the rod 20 almost touches the surface of the solder 2.

In operation the surface of the molten solder 2 in container 1 is skimmed to clear any dross. The rod 20 is passed through hole 10 and abutment 21 adjusted until the pointed end 22 of rod 20 almost touches the surface of the molten solder 2. The operator then adjusts the vertical position of microscope 15 until the sight line 16 appears equidistant between the real end 22 of the rod 20 and the reflection of the same in the surface of the solder. The reading of vernier or micrometer head 19 is then noted. The rod 20 is then removed and the member 9 complete with rod 8 and sample clip 7 is then inserted through the hole 10 and the abutment 12 allowed to rest against the peg 14. A sample is then inserted in sample clip 7 and the member 9 is rotated until the peg 14 and the hole 13 are aligned. The member 9 is then allowed to fall. The friction between the peg 14 and the walls of hole 13 ensuring that the sample enters the solder sufficiently slowly as to ensure that the rise of solder up the sample is due to surface tension rather than through any disturbance of the surface of the solder 2. The microscope 15 is then raised and the sight line 16 aligned with the top of the meniscus of solder up the sample. The reading of vernier or micrometer 19 is again noted, the difference between this last reading and the first mentioned reading providing an indication of the solderability of the sample. This indication may be interpretted by comparing the effect achieved with a sample of known good solderability and with the effect achieved with a sample of poor or bearly acceptable solderability. It is believed, however, that the meniscus height gives a direct indication of the quality of wetting as is explained with reference to FIGS. 2 and 3.

Referring to FIGS. 2 and 3 the most widely accepted criterion of wetting, and hence solderability, is the contact angle between the liquid and the solid sample. Height of rise of meniscus is related to the contact angle, see FIG. 2, by the following expression:

$$\sin \theta = 1 - ]g(\rho-\rho)/\gamma_{LV}] Y^2/2$$

where
$\theta$ is the contact angle
$g$ is the acceleration due to gravity
$\rho$ is the specific gravity of the solder
$\rho$ is the specific gravity of the flux
$\gamma_{LV}$ is the tension in the interface between solder and flux
$Y$ is the height of rise of the meniscus
$g$, $\rho$ and $\rho$ are fairly well established constants; $\gamma_{LV}$ has been found to lie in the region between 350 and 450 dynes per centimetre for 63/37 tin-lead solder and water-white resin flux at 260°C. For this solder and flux system therefore, the relationship between $Y$ and $\theta$ is as depicted in FIG. 3.

The present applicants believe that the measurement of meniscus height, $Y$, can be converted directly to quality of wetting in terms of contact angle $\theta$, subject only to some doubt as to the true value of the interfacial tension $\gamma_{LV}$. For samples so far tested the above described range of values for $\gamma_{LV}$ is found to be valid. Regardless of doubt however the apparatus may be used purely to provide comparative testing.

Referring to FIG. 4 in the modification shown therein the hole 13 in abutment 10 is blind. The hole 13 and the peg 14 in this case acting like a leaking cylinder and piston to achieve a slow rate of descent of the member 9.

We claim:
1. A method of obtaining an indication of the solderability of a metallic surface comprising the steps of noting the level of molten solder in a container, dipping a sample of the metallic surface to be soldered into the solder and noting and comparing the height of the meniscus formed up the sample with the previously noted level of the solder whereby the comparison provides an indication of the solderability of said metallic surface.

2. A method as claimed in claim 1 and wherein the sample is fluxed prior to being lowered into said molten solder.

3. An apparatus for obtaining an indication of the solderability of a metallic surface comprising a container, a quantity of molten solder contained in the container, height measuring means for measuring the level of solder within said container, a sample of the metal to be soldered, lowering means for lowering said sample into said solder and height measuring means for measuring the height of the meniscus of solder up said sample.

4. An apparatus as calimed in claim 3 and wherein said height measuring means for measuring the level of solder in said container and the height of the meniscus comprises a microscope incorporating a sight line and mounted to be of adjustable height by means of a vernier control.

5. An apparatus as claimed in claim 4 and wherein the lowering means for lowering said sample includes means for controlling the rate of descent of said sample into said solder.

6. An apparatus as claimed in claim 5 and wherein said last mentioned means comprise a peg adapted to abut an abutment on a member passing through a beam, arranged bove said solder container, means being provided for suspending said sample from said member, the abutment of said member having a hole provided therein adapted to accept said peg when said member is rotated to align said hole and said peg.

7. An apparatus as claimed in claim 6 and wherein said hole is an open hole extending through said abutment, control of the rate of descent of said sample being obtained by virtue of the friction between said peg and the sides of said hole.

8. An apparatus as claimed in claim 6 and wherein said hole is a blind hole, control of the rate of descent of said sample being obtained by the leaky piston and cylinder effect between said peg and said blind hole.

9. An apparatus as claimed in claim 6 and wherein said hole is a blind hole with an air bleed passage-way so dimensioned as to achieve a required rate of descent of said sample.

10. An apparatus as claimed in claim 6 and wherein a rod is provided having along its length an adjustable abutment, said rod and abutment being provided to enter the hole in said beam from which said member passes, until said abutment abuts said beam, whereupon by adjustment of said adjustable abutment the end of said rod directed towards solder contained in operation in said container, may be adjusted until this almost touches the surface of said solder, whereby the sight line of said microscope may be aligned midway between the end of said rod and reflection of that end in the surface of said solder.

11. An apparatus as claimed in claim 10 and wherein the end of said rod adjacent said solder is pointed.

* * * * *